United States Patent
Scialdone

(10) Patent No.: US 10,717,593 B1
(45) Date of Patent: Jul. 21, 2020

(54) BEVERAGE DISPENSING SYSTEM AND METHOD

(71) Applicant: Mark Scialdone, San Diego, CA (US)

(72) Inventor: Mark Scialdone, San Diego, CA (US)

( * ) Notice: Subject to any disclaimer, the term of this patent is extended or adjusted under 35 U.S.C. 154(b) by 222 days.

(21) Appl. No.: 15/984,336

(22) Filed: May 19, 2018

(51) Int. Cl.
*A47J 31/40* (2006.01)
*B65D 85/804* (2006.01)

(52) U.S. Cl.
CPC ........ *B65D 85/8046* (2013.01); *A47J 31/407* (2013.01)

(58) Field of Classification Search
CPC ........................ B65D 85/8046; A47J 31/407
See application file for complete search history.

(56) References Cited

U.S. PATENT DOCUMENTS

| 5,470,601 | A | 11/1995 | Robertson |
| 7,604,826 | B2 | 10/2009 | Denisart et al. |
| 9,215,946 | B2 | 12/2015 | Jenkins |
| 2011/0226343 | A1 | 9/2011 | Novak et al. |
| 2014/0272016 | A1* | 9/2014 | Nowak ...................... A23L 2/52 426/112 |
| 2015/0166257 | A1* | 6/2015 | Trombetta ........... B65D 5/4204 426/87 |

FOREIGN PATENT DOCUMENTS

| EP | 1472156 B1 | 3/2006 |
| EP | 1808382 B1 | 3/2013 |
| WO | 03059778 A2 | 7/2003 |

* cited by examiner

*Primary Examiner* — Jason L Vaughan
*Assistant Examiner* — Amanda Kreiling
(74) *Attorney, Agent, or Firm* — Ronald J Koch

(57) ABSTRACT

A system and method is presented wherein a disposable pod having two chambers, each of which can be either wet or dry and contain a variety of substances, is sized to fit distinct brewing systems offered by third parties, such that the puncturing and water dispensing functionality of such brewing systems cause the mixture of the variety of substances in the two chambers resulting in a wide range of beverages.

1 Claim, 4 Drawing Sheets

BEVERAGE DISPENSING SYSTEM AND METHOD

FIELD

The subject technology relates generally to coffee brewing systems, and in particular to coffee brewing systems that utilize a disposable cartridge or pod.

BACKGROUND AND SUMMARY

The subject technology is advantageous over conventional coffee brewing systems that utilize a disposable cartridge, or pod, in that a system and method is presented wherein a disposable pod having two chambers, each of which can be either wet or dry and contain a variety of substances. Such pods can be sized to fit specific brewing systems offered by third parties (such as a KEURIG™ brand brewing system using K CUP Brand™ cartridges). The pods of the subject technology are structured such that the puncturing and water dispensing functionality of such brewing systems cause the mixture of the variety of substances in the two chambers resulting in a wide range of beverages not presently possible with such conventional systems.

REFERENCE NUMERALS IN DRAWINGS

Figure 1:
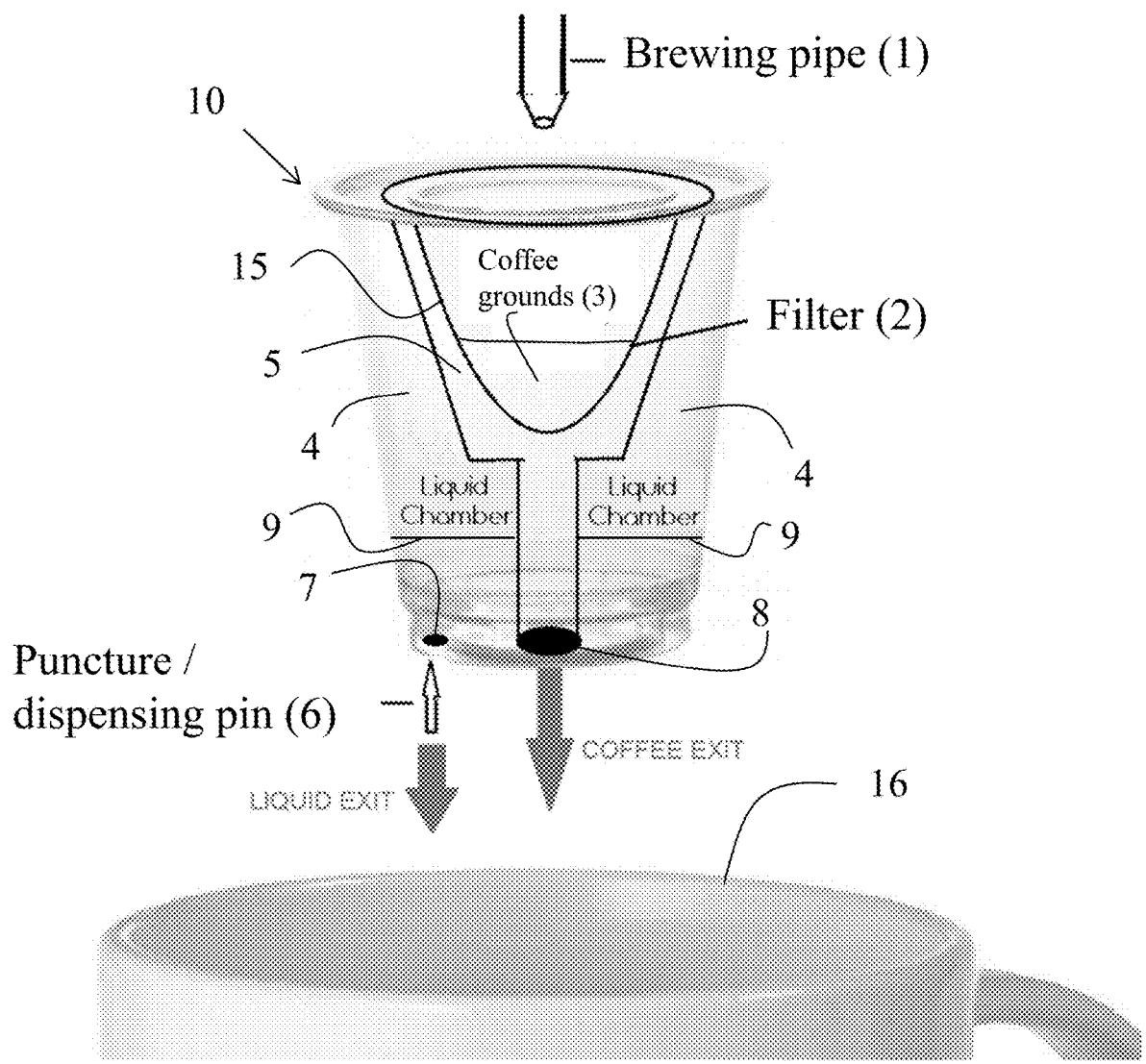
FIG. 1 depicts a front perspective view in one aspect of the subject technology.

The table below lists the reference numerals employed in the figures, and identifies the element designated by each numeral.

Figure 2A:
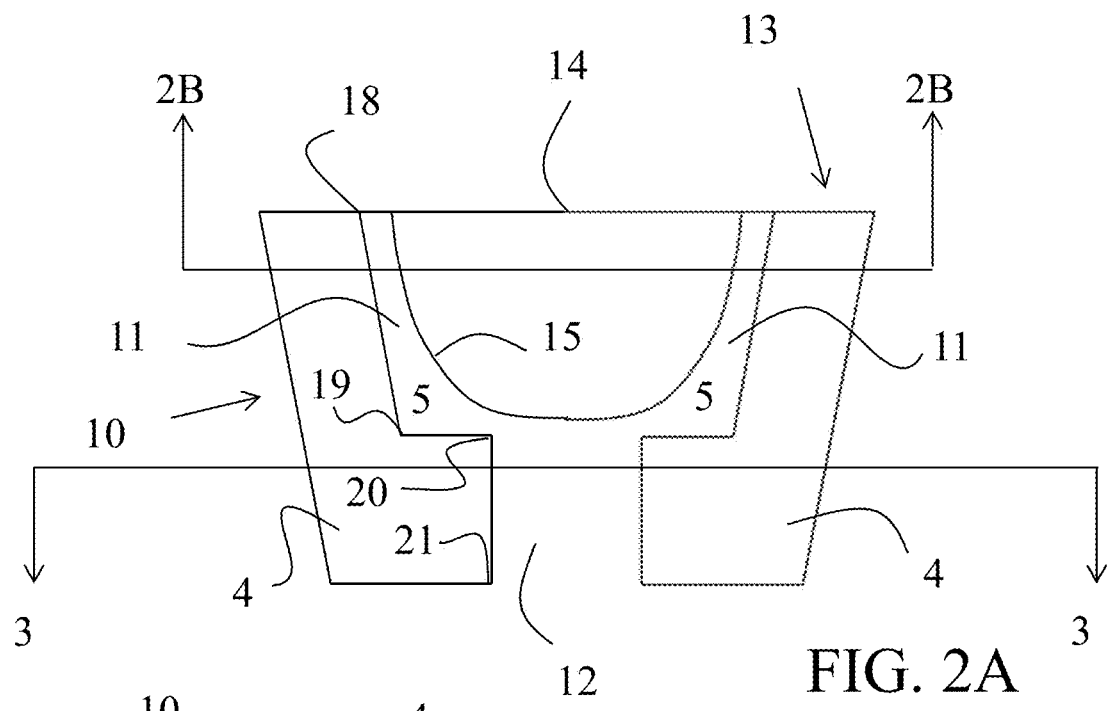
FIG. 2A depicts a cross sectional view taken along the line shown in FIG. 2B
Figure 2B:
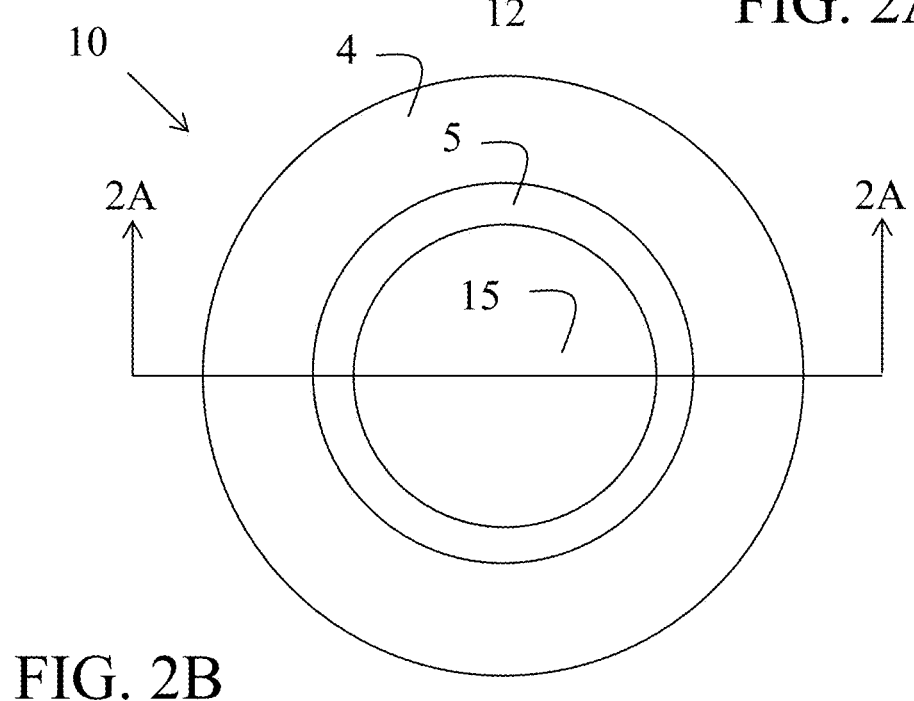
FIG. 2B depicts a top view of cartridge 10, without the seal 14.
Figure 3:
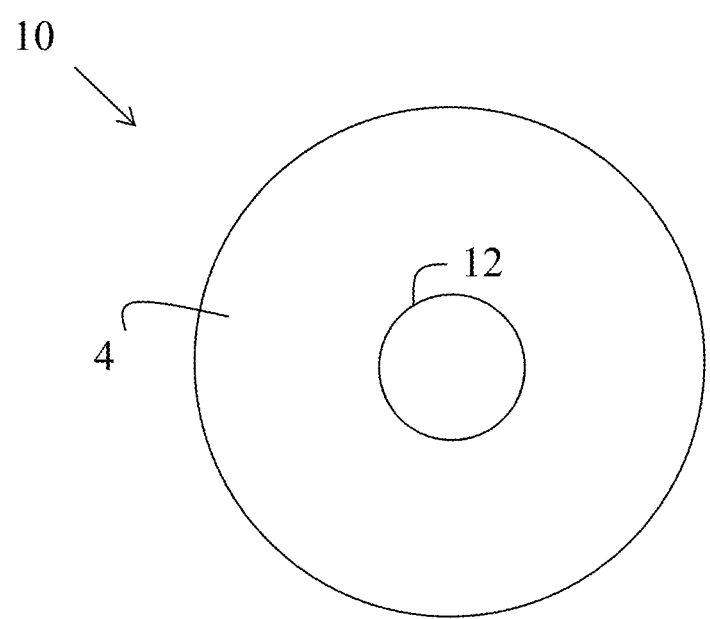
FIG. 3 depicts a cross sectional view taken along the line shown in FIG. 2A

1 brewing pipe 1 of conventional coffee brewing system
2 filter 2 (coffee filter in one aspect of the subject technology, flexible fabric enclosure in another aspect of the subject technology)
3 first substance 3 (particulate substance in one aspect of the subject technology, coffee grounds in another aspect of the subject technology)
4 first chamber 4 (liquid chamber in one aspect of the subject technology, dry chamber in another aspect of the subject technology)
5 second chamber 5
6 puncture/dispensing pin 6 of conventional coffee brewing system
7 location of first dispensing port 7, created by puncture/dispensing pin 6
8 second dispensing port 8, located proximate distal portion 21 of the second chamber 5
9 second substance 9 (alcohol in one aspect of the subject technology)
10 cartridge 10
11 upper portion 11 of the second chamber 5 (FIG. 2A)
12 lower portion 12 of the second chamber 5 (FIG. 2A)
13 top portion 13 of the cartridge 10
14 seal 14
15 third chamber 15
16 container 16 (e.g. coffee mug, FIG. 1)
17 third substance 17 (e.g. water), dispensed via brewing pipe 1
18 proximal portion 18 of the upper portion 11 of the second chamber 5
19 distal portion 19 of the upper portion 11 of the second chamber 5
20 proximal portion 20 of the lower portion 12 of the second chamber 5
21 distal portion 21 of the lower portion 12 of the second chamber 5

DETAILED DESCRIPTION

In one aspect, a beverage dispensing system comprises, a cartridge 10 having: a first chamber 4; a second chamber 5 being radially inside of the first chamber 4, the second chamber 5 having upper and lower portions 11, 12; a third chamber 15; the third chamber 15 being adapted to contain a first substance 3; and a seal 14, the seal being capable of providing seal functionality and being punctured. In one aspect (e.g. FIG. 2A) seal 14 seals an upper portion of first, second, and third chambers 4, 5, & 15.

Figure 4:
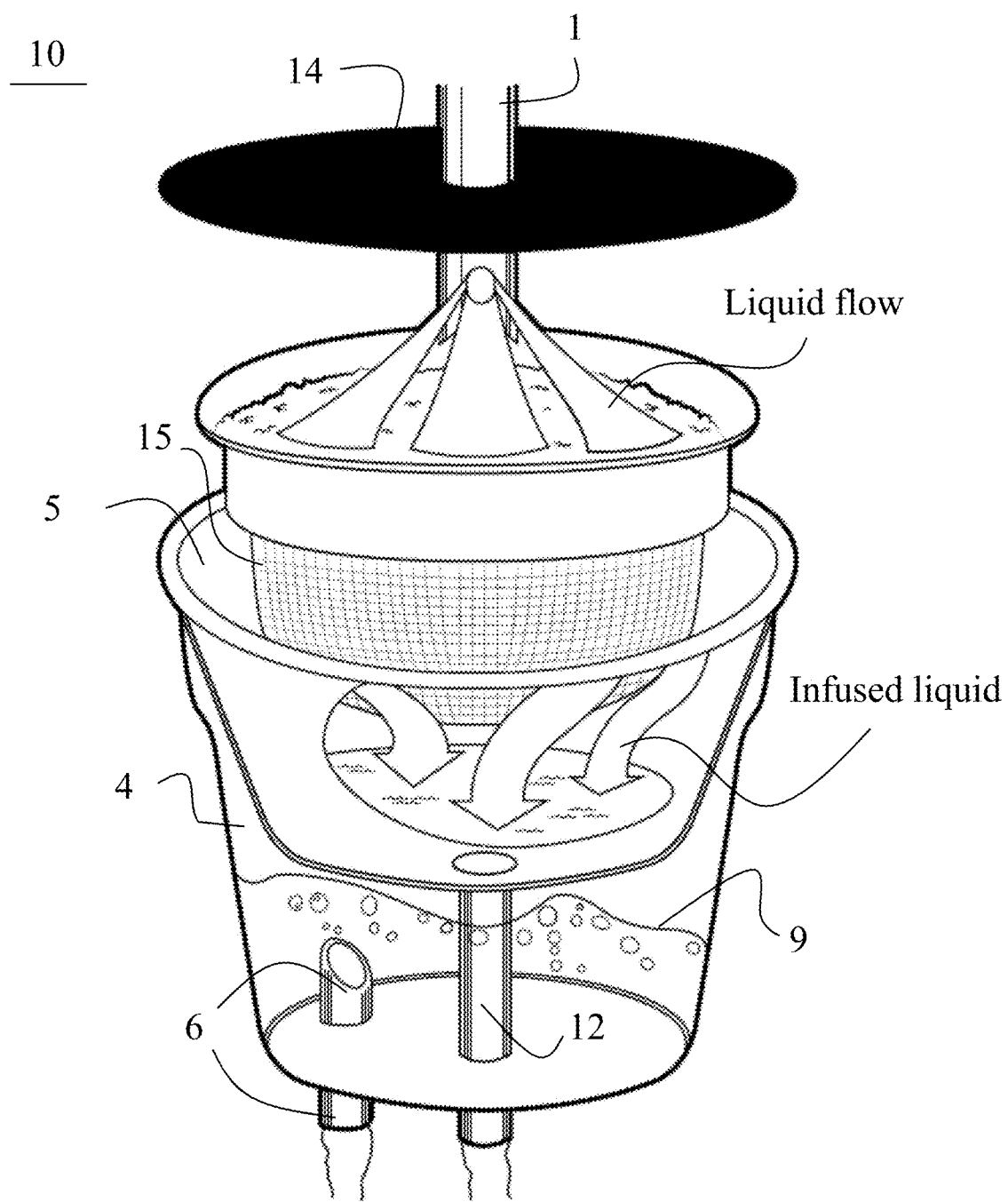
FIG. 4 depicts a perspective x-ray view in one aspect of the subject technology, showing the flow of fluids through cartridge 10.

In one aspect (FIG. 2A), lower portion 12 is radially smaller in diameter than upper portion 11, upper portion 11 has a downwardly tapering side profile, and lower portion 12 is not tapered. In one aspect (FIG. 4), lower portion 12 extends outwardly, or protrudes, from cartridge 10.

In one aspect (FIG. 1) third chamber 15 comprises a coffee filter 2. In another aspect, third chamber 15 comprises a flexible fabric enclosure. In one aspect, third chamber 15 comprises a coffee filter containing coffee grounds. It should be noted that other types of filters can be used in conjunction with coffee, tea, or other particulate substances. In another aspect, third chamber 15 comprises a sealed fluid containing membrane that can be unsealed by pressure or puncture.

In one aspect, seal 14 is adapted to be punctured by a brewing pipe 1 of a single serve coffee brewing system, the brewing pipe 1 being capable of dispensing water into the third chamber 15.

In one aspect, the third chamber 15 is inside of the upper portion 11 of the second chamber 5, the first chamber 4 is completely sealed and adapted to contain a second substance 9, the first chamber 4 is adapted to be capable of being punctured to release the second substance 9, and the seal 14 is adapted to be capable of being punctured to allow a third substance 17 (e.g. water) to enter the third chamber 15 and comingle with the first substance 3, a portion of the combination of the first substance 3 and the third substance 17 flowing outwardly through the lower portion 12 of the second chamber 5. In one aspect, second substance 9 is released into a container 16.

As used, the term "comingle" is understood to be analogous to the operation of a drip brewing coffee system, or alternatively a pressurized system wherein the water is infused with coffee. In one aspect, the combination of the first substance 3 and the third substance 17 flows outwardly through the lower portion 12 of the second chamber 5 into a container 16.

In one aspect, the first chamber 4 is adapted to contain a fluid (e.g. alcohol), the first chamber 4 is capable of being punctured by a puncture/dispensing pin 6 of a coffee brewing system thus allowing the second substance 9 to flow from the first chamber 4. Thus, the subject technology can be used in conjunction with a conventional coffee brewing system (such as a KEURIG™ brand brewing system using K CUP Brand™ cartridges), the cartridge 10 being sized accordingly. Whereas a conventional system contains only coffee in a filter, the subject technology is configured such that the second substance 9 is released upon puncture of the first chamber 4. Thus, the subject technology offers an advantage because the second substance 9 (e.g. alcohol) is released along with brewed coffee; instead of flowing through first dispensing port 7, the brewed coffee flows through second dispensing port 8 and the second substance 9 flows through first dispensing port 7. In one aspect, the first chamber 4 is hermetically sealed. Those of skill in the art will appreciate that cartridge 10 can be configured to fit a variety of brewing systems, including single serve coffee dispensers.

In one aspect, the upper portion 11 of the second chamber 5 has a downwardly tapering side profile (e.g. FIG. 2A) wherein a proximal portion 18 of the upper portion 11 has a larger diameter than a distal portion 19 of the upper portion 11, and the upper portion 11 of the second chamber 5 is in fluid communication with the lower portion 12 of the second chamber 5.

In one aspect, brewed coffee flows from the upper portion 11 through the lower portion 12 into a container 16 (e.g. coffee cup) wherein the brewed coffee is mixed with the second substance 9 (e.g. alcohol), resulting in a caffeinated alcoholic beverage. It should be understood that myriad mixtures of substances are possible, wet or dry, including coffee, tea, alcohol, flavoring, syrups, extracts, and juices.

In one aspect, the distal portion 19 of the upper portion 11 has a larger diameter than the lower portion 12 of the second chamber 5. In one aspect, distal portion 21 of the lower portion 12 is open. In this aspect, the distal portion 21 is open, and the entire cartridge 10 is packaged in an airtight, or vacuum package, to preserve the freshness of the first substance 3 (e.g. coffee grounds). In another aspect, the distal portion 21 of the lower portion 12 is sealed. In this aspect, the seal is adapted to be capable of being punctured by the various means as described herein as well as those known to those of skill in the art.

While this invention has been shown and described with respect to detailed embodiments thereof, it will be understood by those skilled in the art that changes in form and detail thereof may be made without departing from the scope of the claims of the invention.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A beverage dispensing system comprising:
   a cartridge having:
      a first chamber;
      a second chamber being radially inside of the first chamber, the second chamber having upper and lower portions;
      a third chamber,
         the third chamber being adapted to contain a first substance;
      and a seal, the seal being capable of being punctured, the seal being adapted to seal at least a portion of the first, second, and third chambers;
   the first chamber being adapted to contain a second substance;
   the third chamber being inside of an upper portion of the second chamber;
   the first chamber is adapted to be capable of being punctured to release the second substance;
   the seal is adapted to be capable of being punctured to allow a third substance to enter the third chamber and comingle with the first substance, a portion of the combination of the first substance and the third substance flowing outwardly through the lower portion of the second chamber;
   the upper portion of the second chamber having a downwardly tapering side profile wherein a proximal portion of the upper portion has a larger diameter than a distal portion of the upper portion;
   the upper portion of the second chamber being in fluid communication with the lower portion of the second chamber;
   the distal portion of the upper portion of the second chamber having a larger diameter than the lower portion of the second chamber;
   a distal portion of the lower portion of the second chamber being open.

* * * * *